United States Patent [15] 3,707,216
Peres [45] Dec. 26, 1972

[54] CONVEYOR JOGGING MECHANISM
[72] Inventor: Anthony R. Peres, Bristol, N.Y.
[73] Assignee: Peres Electronic Machinery, Inc., Rochester, N.Y.
[22] Filed: Feb. 26, 1971
[21] Appl. No.: 119,194

[52] U.S. Cl. .................................... 198/30, 198/32
[51] Int. Cl. ............................................. B65g 47/26
[58] Field of Search ...................... 198/30, 32, 31 AB

[56] References Cited

UNITED STATES PATENTS

| | | | |
|---|---|---|---|
| 2,315,880 | 4/1943 | Stiles | 198/32 |
| 3,117,665 | 1/1964 | Nekola et al. | 198/30 |
| 2,373,600 | 4/1945 | Richey | 198/30 |

FOREIGN PATENTS OR APPLICATIONS

| | | | |
|---|---|---|---|
| 6,716,950 | 6/1969 | Netherlands | 198/30 |

Primary Examiner—Richard E. Aegerter
Assistant Examiner—Douglas D. Watts
Attorney—Cumpston, Shaw & Stephens

[57] ABSTRACT

A jogging mechanism for a conveyor or the like for preventing the jamming or bridging of articles on the conveyor. The jogging mechanism comprises an article-engaging wall member on the conveyor and a mechanism for simultaneously moving the wall member in two different directions. The moving mechanism comprises a reciprocating mechanism for moving the wall member back and forth substantially along a rectilinear path, and structure engageable by the ends of the wall member during reciprocal movement of the wall member along the rectilinear path, the structure imparting movement to the member in a direction transverse to the rectilinear direction.

9 Claims, 9 Drawing Figures

PATENTED DEC 26 1972

INVENTOR.
ANTHONY PERES
BY *Cumpston, Shaw and Stephens*
ATTORNEYS

PATENTED DEC 26 1972

INVENTOR.
ANTHONY PERES
BY Lumpston, Shaw
and Stephens
ATTORNEYS

CONVEYOR JOGGING MECHANISM

BACKGROUND OF THE INVENTION

1. Field of the Invention

This invention relates generally to conveyor mechanisms, and more specifically to a jogging mechanism for a conveyor or the like for preventing the jamming of conveyed articles.

2. Description of the Prior Art

Conveyors for moving articles such as cans, bottles, or the like along a predetermined path from one station to another station are generally well-known in the art. Such conveyors have side walls to provide a guide path for the articles, and in some operations the side walls are spaced apart a greater distance at the point where the articles are introduced into the conveyor, and the side walls converge as they progress towards the delivery end of the conveyor. Normally at the delivery end, the side walls of the conveyor are parallel to one another for delivering the articles to a work station preferably in single-line array. In conveying systems of this type, a problem occurs at the junction of the converging and parallel sidewalls. At this junction, a plurality of articles attempting to enter the narrower space between the parallel sidewalls, strike one another resulting in the formation of a jam or bridge of articles which completely blocks the passage of articles into the delivery end of the conveyor. Various prior devices have been proposed for avoiding or preventing such jamming of articles in conveyors, including jogging mechanisms such as disclosed in U.S. Pat. Nos. 1,196,442 and 2,615,555. In such jogging mechanisms, the conveyor is provided in the area where the jamming normally occurs with a reciprocally movable sidewall member. Another jogging mechanism is disclosed in U.S. Pat. No. 2,315,880 comprising an oscillatable, pivotal wall member. Although such prior art mechanisms operate satisfactorily, they are not foolproof and in certain instances jamming still occurs.

SUMMARY OF THE INVENTION

This invention includes within its scope an improved jogging mechanism for a conveyor or the like to prevent the jamming of articles on a conveyor. The conveyor is provided near the area where article jamming normally occurs with an article engaging sidewall member that is mounted for simultaneous movement in two different directions. More specifically, the sidewall member is provided with a pivot preferably at its center, and an arm coupled to the pivot and reciprocally driven in a rectilinear direction. The conveyor is further provided with spaced-apart cam means engageable by the ends of the wall member for imparting pivotal movement to the wall member as it is moved back and forth by the driven arm.

It is therefore one of the objects of the present invention to provide an improved jogging mechanism for a conveyor or the like having a reciprocally movable article-engaging sidewall member that is simultaneously moved in rectilinear and pivotal directions.

Another object of the invention is to provide an improved jogging mechanism for a conveyor or the like that is of simple design and construction, thoroughly reliable in operation, and economical to manufacture.

The invention and its objects and advantages will become more apparent from the detailed description of the preferred embodiments presented below.

BRIEF DESCRIPTION OF THE DRAWING

In the detailed description of the preferred embodiments of the invention presented below, reference is made to the accompanying drawings, in which.

DESCRIPTION OF THE PREFERRED EMBODIMENTS

Figure 2:
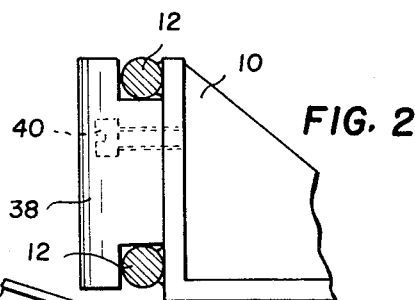
FIG. 2 is an end view taken from line 2 — 2 of FIG. 1.
Figure 3:
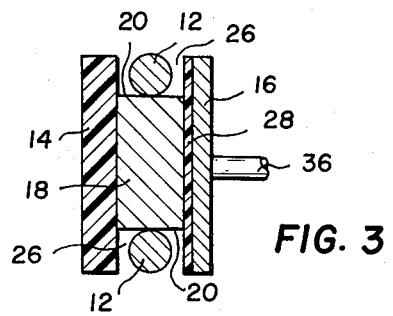
FIG. 3 is a section view taken substantially along line 3 — 3 of FIG. 1.
Figure 4:
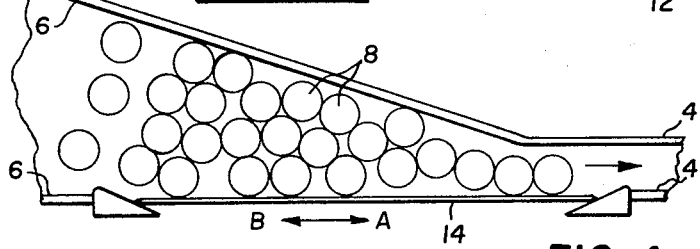
FIGS. 4 – 6 are schematic views of the jogging mechanism illustrating the different positions assumed by a reciprocally movable sidewall member as it is simultaneously moved in rectilinear and pivotal directions.

With reference to the drawings, particularly FIG. 4, the jogging mechanism is schematically illustrated in combination with a conveyor having parallel sidewalls 4 forming a delivery end of the conveyor and converging sidewalls 6 for supplying articles such as bottles 8 to the delivery end. In the embodiment of the jogging mechanism illustrated in FIGS. 1 – 3, conveyor frame members 10 are shown for supporting a pair of rigid, spaced-apart, parallel guide rails 12. The jogging mechanism as best seen in FIG. 3 comprises a flat, elongated, rectangular sidewall member 14 on one side of guide rails 12, a back-up plate 16 on the opposite side of the guide rails, and a spacer bearing 18 clamped between sidewall member 14 and back-up plate 16, and having opposed sides 20 slidably engageable with guide rails 12. The sidewall member 14, spacer bearing 18 and back-up plate 16 rigidly secured together by any suitable means such as a bolt 22 and nut 24 (see FIG. 1) to form a jogging unit supported for movement by guide rails 12. The wall member 14 and back-up plate 16 are of a greater height than spacer bearing 18, and cooperate therewith to form a pair of recesses 26 within which guide rails 12 are captured, as best seen in FIG. 3. The width of recesses 26 is greater than the diameter of guide rails 12 to provide lost motion for permitting lateral motion of the jogging unit relative to guide rails 12. Since the length of the jogging unit is less than the length of guide rails 12, reciprocal movement of the unit in a direction parallel to the guide rails is permitted as well. To minimize wear between guide rails 12 and the jogging unit, and to facilitate movement of the parts, the wall member 14, back-up plate 16, and spacer bearing 18 may be constructed of or faced with any suitable material such as Delrin (trademark), Teflon (trademark) or the like that has inherent lubricating qualities. In FIG. 3 back-up plate 16 is provided with such a coating 28.

Figure 1:
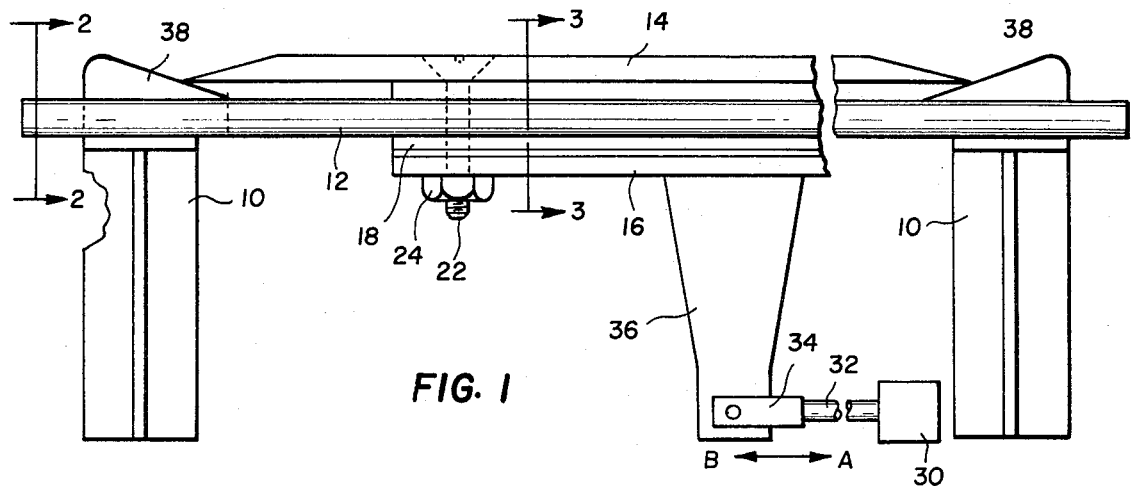
FIG. 1 is a top plan view illustrating one embodiment of the jogging mechanism of this invention.
Figure 5:
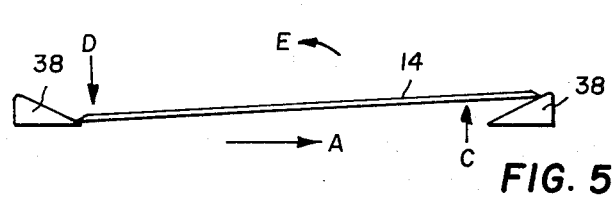
Figure 6:
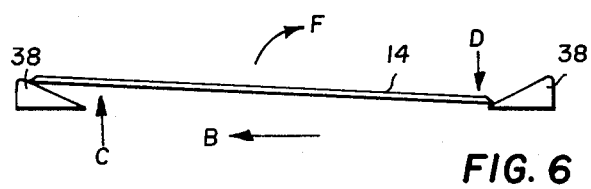

The jogging unit is movable in rectilinear directions A and B (see FIGS. 4 – 6) parallel to guide rails 12 by any suitable reciprocating mechanism such as a double acting piston and fluid cylinder 30 shown in block diagram form in FIG. 1 having a piston rod 32 and yoke 34 at one end pivotally secured to one end of a laterally extending arm 36 rigidly secured to back-up plate 16 of the jogging unit. Any other suitable reciprocating mechanism such as a rotatable eccentric crank coupled to the arm of the jogging unit may be used. The conveyor structure is further provided with cam means in the form of a pair of spaced-apart inclined ramps 38 secured to the frames 10 by screws 40, as best seen in FIG. 2, and preferably spaced apart a distance substantially as great as the length of wall member 14. Accordingly, when the jogging unit is moved in a rectilinear direction A by the reciprocating mechanism as seen in FIG. 5, one end of wall member 14 will slide up its complimentary ramp 38 moving a part of the wall member in the lateral direction C, while the other end slides down its complimentary ramp 38 moving the remainder of the wall member in the lateral direction D. The result of such lateral movements is to pivotally move wall member 14 in the direction E. When the rectilinear direction of movement is reverse to B as seen in FIG. 6, the reverse situation occurs. As the ends simultaneously slide up and down their complimentary ramps 38, they are laterally moved in the directions C, D shown in FIG. 6 causing wall member 14 to be pivoted in the opposite direction F. The lateral and pivotal movement of the jogging unit is permitted by virtue of the aforementioned lost motion existing between guide rails 12 and the adjacent surfaces of wall member 14 and back-up plate 16. Naturally, such lost motion must be at least one-half the maximum distance that the end of member 14 is moved laterally outwardly. To facilitate pivotal movement of wall member 14 and to accommodate tolerances between the moving and stationary parts, the end of the wall member may be made slightly flexible. This may be accomplished by properly shaping the ends in the form of a V as seen in FIG. 1, or constructing them of some suitable flexible material.

Figure 7:
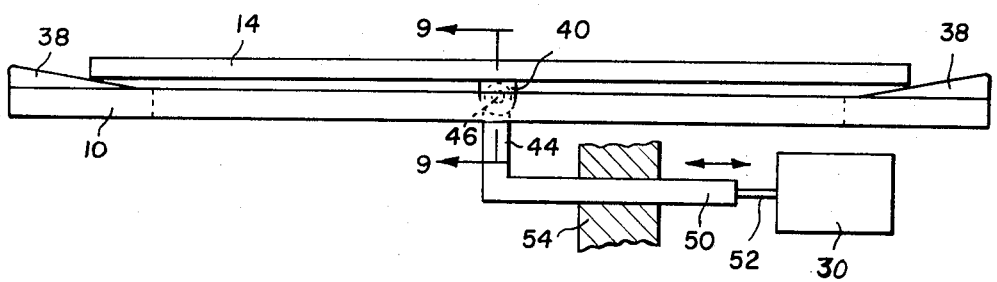
FIG. 7 is a top plan elevational view similar to FIG. 1 illustrating another embodiment of the jogging mechanism of this invention.
Figure 8:
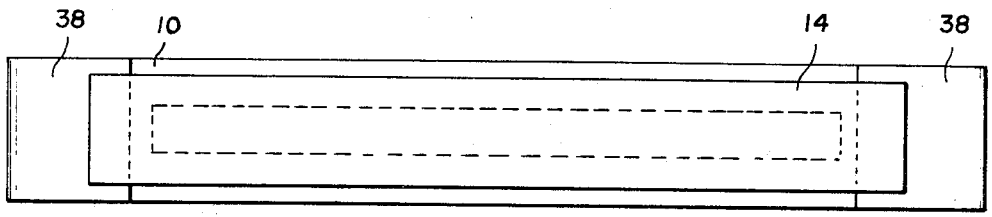
FIG. 8 is a rear elevational view of the jogging mechanism of FIG. 7.
Figure 9:
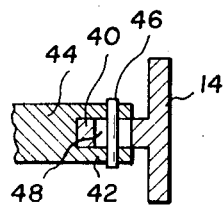
FIG. 9 is an enlarged view in section taken substantially along line 9 – 9 of FIG. 7.

A much more simplified version of a jogging mechanism is disclosed in FIGS. 7 – 9. In this embodiment, parts similar to aforementioned parts will be designated by the same numerals. The wall member 14 is a single member having a laterally extending flange 40 secured to its center portion as best seen in FIG. 9. A yoke 42 at one end of an arm 44 extends over flange 40 and is pivotally secured thereto by a bolt 46 extending through openings in yoke 42 and an elongated opening 48 in flange 40. The opposite laterally extending end 50 of arm 44 is rigidly secured to a piston rod 52 and is constrained for rectilinear movement in directions A and B by a support member 54. As in the aforementioned embodiment, back and forth movement of wall member 14 and arm 44 by the reciprocating mechanism causes the ends of wall member 14 to cooperate with complimentary ramps 38 for simultaneously imparting rectilinear and pivoted movement to the wall member. Accordingly, as illustrated in FIG. 4, any bottles 8 or the like which are passing from the converging conveyor walls 6 to the delivery end 4 of the conveyor are subjected during operation of the jogging mechanism not only to a force tending to move the articles back and forth in the rectilinear directions A and B, but in addition subject some of the articles 8 to a force tending to move the articles in a direction transverse to the direction of the conveyor. This simultaneous application of forces to the articles 8 in more than one direction has been found to be extremely effective in eliminating the problem of the jamming of articles along a conveyor line.

The invention has been described in detail with particular reference to preferred embodiments thereof, but it will be understood that variations and modifications can be effected within the spirit and scope of the invention described hereinabove.

I claim:

1. In an article jogging mechanism for a conveyor or the like, the combination comprising:
   means for conveying articles;
   means associated with said article conveying means for jogging at least some of the conveyed articles;
   said jogging means having article-engaging means comprising an elongated member, means for simultaneously moving said article engaging means in two different directions of movement, said moving means comprising reciprocating means for moving said member in a substantially rectilinear direction, and cam means cooperating with said reciprocating means when moved in said rectilinear direction for pivotally moving said member.

2. The invention according to claim 1 wherein said article engaging means comprises a substantially flat, rectangular, elongated member, pivotal about a pivot spaced from a free end of said member, and said moving means comprises reciprocating means coupled to said pivot for moving said member in a substantially rectilinear direction, and cam means cooperating with said free end of said member while said member is moving in said rectilinear direction for pivotally moving said member.

3. The invention according to claim 2 wherein said cam means comprises a ramp engageable by said free end of said member, said free end being moved back and forth on said ramp.

4. In an article jogging mechanism for a conveyor or the like, the combination comprising:
   means for conveying articles;
   means comprising an article engaging member associated with said article conveying means for jogging at least some of the conveyed articles; and
   means for simultaneously imparting to said jogging means a combination of reciprocatory movement in a substantially rectilinear direction, and pivotal movement in a direction transverse to said rectilinear direction, said imparting means comprising reciprocating means for imparting reciprocatory movement to said article engaging member in a substantially rectilinear direction, and cam means cooperating with said moving reciprocating means for imparting pivotal movement to said member.

5. The invention according to claim 4 wherein said jogging means comprises a substantially flat, rectangular, elongated article engaging member pivotal about a pivot spaced from a free end of said member, and said imparting means comprises reciprocating means coupled to said pivot for imparting reciprocatory movement to said member in a substantially rectilinear direction, and a ramp cooperating with said free end of said pivotal member while said member is reciprocated for imparting pivotal movement to said member.

6. In an article jogging mechanism for a conveyor or the like, the combination comprising:

means for conveying articles comprising a conveyor having spaced-apart converging sidewalls at the conveyor supply end and spaced-apart parallel sidewalls at the conveyor delivery end;

jogging means substantially at the junction of said supply and delivery ends for engaging and jogging at least some of the conveyed articles;

said jogging means comprising an article engaging member forming a part of one of said sidewalls, and means for simultaneously moving said article engaging member in two different directions of movement, said moving means comprising reciprocating means coupled to said article engaging member for moving said member in a substantially rectilinear direction, and means cooperating with said member during its movement in said rectilinear direction for pivotally moving said member in a direction transverse to said rectilinear direction.

7. The invention according to claim 6 wherein said article engaging member is pivotal about a pivot spaced from an end of said member, and said moving means comprises a reciprocating means coupled to said pivot for moving said member in a substantially rectilinear direction, and a ramp engageable by said one end of said member during its movement in said rectilinear direction for pivotally moving said member in a direction transverse to said rectilinear direction.

8. The invention according to claim 6 wherein said article engaging member is substantially flat, elongated and rectangular, and has two free ends and a pivot centrally of said free ends about which said member pivotal, and said moving means comprises a reciprocating means coupled to said pivot for moving said member in a substantially rectilinear direction, and a pair of spaced-apart cam means on said conveying means, each cam means adopted to be engageable by a complimentary one of said free ends upon movement of said member in said rectilinear direction for pivotally moving said member in a direction transverse to said rectilinear direction.

9. The invention according to claim 8 wherein said cam means comprises ramps facing in opposite directions, each ramp having a base, one end displaced a predetermined distance from said base and the other end displaced a greater distance from said base, and said one end of each of said ramps is closer to said pivot than said other end.

* * * * *